Aug. 17, 1926.
E. R. BURTNETT
1,596,400
INTERNAL COMBUSTION ENGINE
Filed July 16, 1924
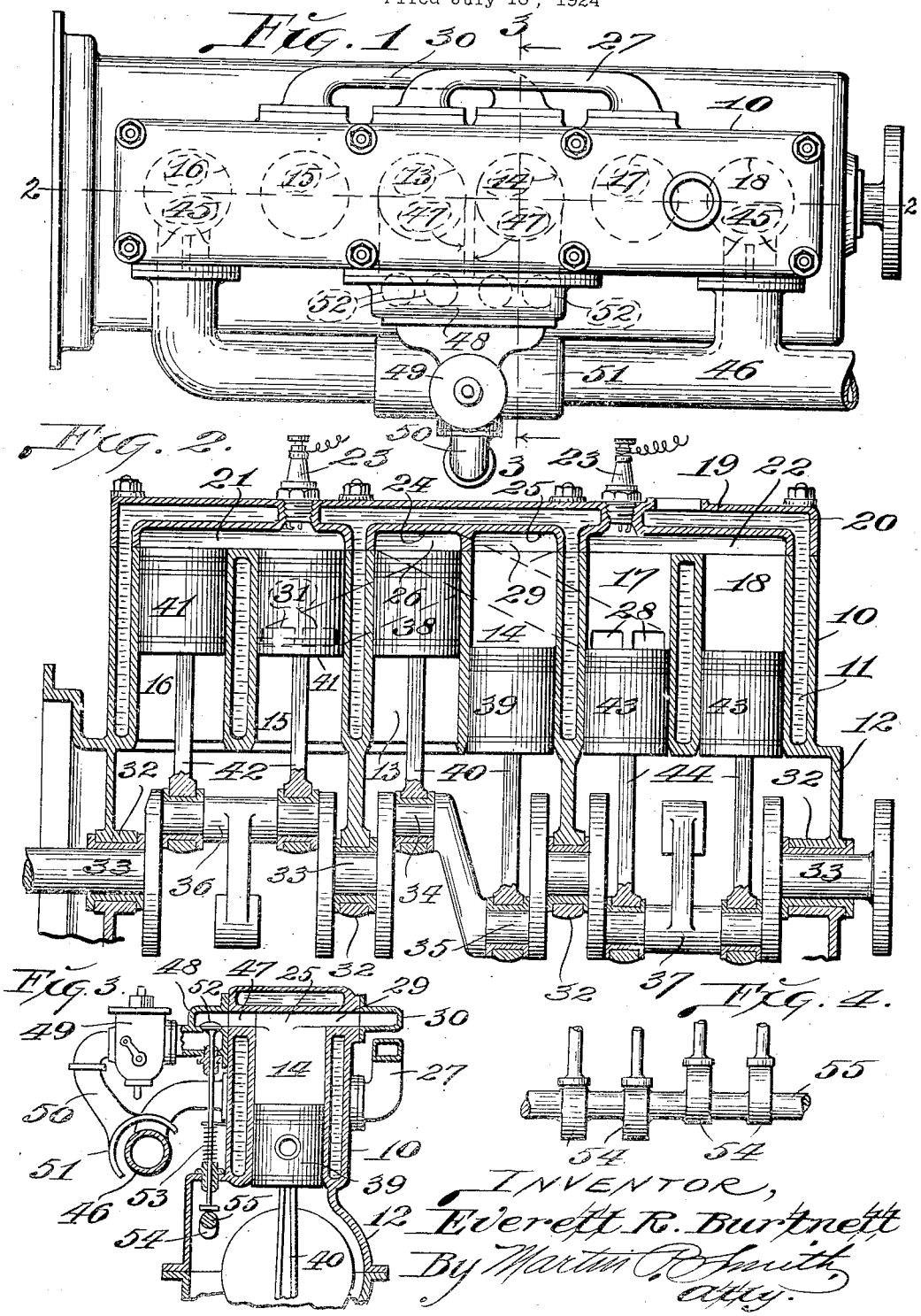

Patented Aug. 17, 1926.

1,596,400

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA; A VOLUNTARY TRUST.

INTERNAL-COMBUSTION ENGINE.

Application filed July 16, 1924. Serial No. 726,321.

My invention relates to certain improvements in internal combustion engines of the general type disclosed in my copending U. S. patent application Serial No. 676,280, filed November 22, 1923, and Serial No. 718,836 filed June 9th, 1924, the principal objects of my invention being to generally improve upon and simplify the construction of the engines disclosed in my aforesaid applications, and to provide a multi-cylinder, two stroke cycle internal combustion engine having two or more gaseous fuel precompression cylinders, each of the latter functioning to supply charges of precompressed gaseous fuel to the members of a pair of connected combustion chambers, with the gaseous fuel inlet ports and the exhaust ports and manifold on one side of the cylinder block and with the precompressed gaseous fuel transfer ducts from the pumping cylinders to the combustion cylinders on the other side of said cylinder block.

My improved arrangements are effective in greatly simplifying the manufacture, assembly and repairs of the engine, and its associated parts, and provides a structure that is very compact, strong and rugged, the parts of the engine being readily accessible in the event of adjustments or repairs being necessary.

With the foregoing and other objects in view, my invention consists in certain novel features of construction and arrangement of parts that will be hereinafter more fully described and claimed and illustrated in the accompanying drawings, in which Figure 1 is a top plan view of an internal combustion engine of my improved construction;

Figure 2 is a vertical section taken on the line 2—2 of Figure 1;

Figure 3 is a cross section taken on the line 3—3 of Figure 1;

Figure 4 is an elevational view of the cams that actuate the gaseous fuel inlet valves into the precompression cylinders.

Referring by numerals to the accompanying drawings, 10 designates a cylinder block, the walls of which are provided with communicating chambers 11 through which a cooling fluid medium may be circulated, and said block surmounts an upper crank case member 12. Formed in the central portion of block 10 are gaseous fuel precompression chambers 13 and 14, the axes of which are parallel, and formed in said block between the chamber 13 and the adjacent end of said block is a pair of combustion chambers 15 and 16, the axes of which are parallel with each other and with the axes of chambers 13 and 14. Formed in the block between chamber 14 and the adjacent end of said block is a pair of combustion chambers 17 and 18, the axes of which are parallel with each other and with the axes of the chambers 13 to 16, inclusive.

Secured in position on top of block 10 is a head block or plate 19 having a chamber 20 through which may be circulated a fluid cooling medium, and formed in the under side of this block adjacent to its ends are shallow chambers 21 and 22. Chamber 21 connects and serves as a common clearance compression and combustion chamber for the combustion chambers 15 and 16, and in like manner chamber 22 connects and serves as a common clearance compression and combustion chamber for chambers 17 and 18.

Seated in head block 20 and preferably at points above the combustion cylinders 15 and 16 are spark plugs 23, the terminals of the electrodes of which project into the chambers 21 and 22. Formed in the under side of the central portion of block 19 are shallow recesses or chambers 24 and 25 that communicate, respectively, with the precompression chambers 13 and 14. Leading through the side wall of head block 19 from chamber 24 is a gaseous fuel transfer outlet port 26, the same communicating with the upper end of an inclined transfer duct 27 that is arranged on the side of the cylinder block, and the lower end of this duct communicates with transfer inlet ports 28 that are formed in the wall of block 10 and which communicate with the intermediate portion of combustion chamber 17.

Leading through the side wall of block 19 from chamber 25 is a gaseous fuel outlet port 29 that communicates with the upper end of an inclined transfer duct 30, the lower end of the latter communicating with transfer inlet ports 31 that are formed in the wall of block 10 and which communicate with the intermediate portion of combustion chamber 15.

Crank case member 12 is provided with four bearings 32 for a crank shaft 33, the latter having four throws or cranks 34, 35, 36 and 37. Cranks 34 and 35, which are located at the center of the crank shaft, are disposed diametrically opposite to each other, or 180° apart, and crank 34 is disposed beneath chamber 13, and crank 35 is disposed beneath chamber 14. Crank 36, which is of sufficient length to accommodate two connecting rods, is arranged beneath the combustion chambers 15 and 16, and it occupies the same radial plane with crank 34. Crank 37, which is of sufficient length to accommodate two connecting rods, is located beneath chambers 17 and 18 and as it occupies the same radial plane with crank 35, it is arranged 180° from, or diametrically opposite to, crank 36.

Pistons 38 and 39 are arranged, respectively, within pumping chambers 13 and 14, and said pistons are connected, respectively, to cranks 34 and 35 by suitable connecting rods 40. Pistons 41, that are arranged for operation in combustion cylinders 15 and 16, are connected to crank 36 by suitable connecting rods 42, and in a similar manner pistons 43 within combustion chambers 17 and 18 are connected to crank 37 by connecting rods 44.

Formed through the wall of block 10 and on the opposite side from the transfer ducts 27 and 30 and the ports at the ends of said ducts and leading from the chambers 16 and 18 are exhaust ports 45, the outer ends of which communicate with an exhaust manifold 46 that is located on the corresponding side of the cylinder block. These exhaust ports are located in the same plane with the gaseous fuel inlet ports 28 and 31, and both sets of ports are so located that they are wholly uncovered only when the pistons in the respective chambers are at the outer or lower end of their travel.

Formed through the side wall of head 19 and directly opposite to the transfer outlet ports 26 and 29 are gaseous fuel inlet ports 47, the same communicating with the chambers 24 and 25, and communicating with the outer ends of these inlet ports is a gaseous fuel inlet manifold 48 that is connected to a suitable source of gaseous fuel supply, preferably a curbureter, such as 49. The air for this carbureter is taken through a pipe 50 from a heater or "stove" 51, which latter partially surrounds the adjacent exhaust manifold 46.

The flow of gaseous fuel through the manifold to the respective inlet ports 47 is controlled by pairs of valves such as 52 that are adapted to normally rest on suitably formed seats within the manifold, said valves being normally closed by springs 53 that are associated with their stems, and said valves being actuated by cams 54 that are located upon a cam shaft 55. This cam shaft is actuated at the same speed as crank shaft 33 and it is preferably driven by suitable gearing directly from said crank shaft.

In the operation of my improved engine, the gaseous fuel from carbureter 49 passes alternately into the precompression chambers 13 and 14, as the two sets of valves 52 are alternately opened by the oppositely arranged pairs of cams 54. The precompression pistons 38 and 39 travel in opposite directions, due to the arrangement of cranks 34 and 35, and thus as the gaseous fuel charge is drawn into one precompression chamber on the outward stroke of the piston therein, the piston in the other chamber is moving inwardly to precompress a gaseous fuel charge that is admitted to the corresponding pair of combustion chambers when the pistons therein reach the outer ends of their strokes so as to uncover the corresponding gaseous fuel transfer inlet ports. For instance, when pumping piston 38 reaches the inner end of its stroke, as illustrated in Figure 2, the pistons 43 in the combustion chambers 17 and 18 reach the outer ends of their travel, thereby uncovering transfer ports 28 and the precompressed fuel charge passes from chamber 24, through duct 27, through inlet ports 28, into and upwardly through chamber 17, through common clearance chamber 22, and thence downwardly through combustion chamber 18, and in so doing the products of combustion from the previously ignited charge will be forced out through the exhaust ports that lead from chamber 18 and said exhaust products of combustion thus find exit through exhaust manifold 46.

As pistons 43 move inward, the exhaust port leading from chamber 18 and the transfer ports 28 are covered and closed, and the charge of gaseous fuel admitted to the chambers 17 and 18 will be compressed in common clearance chamber 22, and at the point of highest compression, or as the pistons pass their high centers, the compressed gaseous fuel charge is ignited by a spark produced between the terminals of the electrodes of the corresponding plug 23, and the expansion following combustion of the compressed fuel charge will be directed against the heads of the pistons 43 to drive the same downward on their power stroke. In a similar manner, pumping piston 39 precompresses gaseous fuel charges and forces the same through duct 20 and transfer inlet ports 31 into the combustion chambers 15 and 16.

Thus it will be seen that I have provided a two stroke cycle internal combustion engine that involves two co-operating power units, each comprising three cylinders, two of which function as combustion cylinders and the other functioning as a gaseous fuel pumping or precompression cylinder, and the pair of precompression cylinders being arranged between and in line with the pairs of combustion cylinders. Further, in my improved engine, the gaseous fuel inlet ports and control valves for the precompression cylinders and the exhaust ports and the exhaust manifold are all located on one side of the cylinder block, and the precompressed gaseous fuel transfer ducts and the transfer ports are located on the opposite side of the cylinder block.

This arrangement greatly simplifies manufacture and assembly of the engine, and in addition renders the externally arranged parts readily accessible in the event of adjustments or repairs being made.

Obviously the construction of my improved engine as herein shown and described may be varied in certain details without departing from the spirit of the invention, the scope of which is set forth in the appended claims.

I claim as my invention:

1. In a two stroke cycle internal combustion engine, a series of six cylinders arranged in row, the two center cylinders functioning as gaseous fuel precompression cylinders which cylinders are provided at their head ends with laterally extending compression clearance chambers, valve controlled ports on one side of the engine for controlling the admission of gaseous fuel to the corresponding ends of the laterally disposed compression clearance chambers, exhaust ports leading from certain of the combustion cylinders, an exhaust manifold on the same side of the row of cylinders with the gaseous fuel inlet ducts, and precompressed gaseous fuel ducts arranged between the opposite ends of said laterally disposed compression clearance chambers and certain of the combustion cylinders and located on the opposite side of the row of engine cylinders.

2. In a two stroke cycle internal combustion engine, a series of six cylinders arranged in row, the two center cylinders functioning as pumping cylinders, the two pairs of end cylinders functioning as combustion cylinders the head ends of said pumping cylinders being provided with laterally extending compression clearance chambers, transfer ducts arranged on one side of the row of cylinders and leading from the corresponding ends of the laterally disposed compression clearance chambers of the pumping cylinders to the intermediate portions of certain of the combustion cylinders, valve controlled ducts and ports arranged on the opposite side of the row of cylinders for admitting gaseous fuel charges to the corresponding ends of said laterally disposed common compression clearance chambers, certain of the combustion cylinders being provided on the same side with the gaseous fuel admission means with exhaust ports, an exhaust manifold to which said ports are connected, pistons arranged for operation within all of the cylinders, and a crank shaft to which said pistons are connected.

In testimony whereof I affix my signature.

EVERETT R. BURTNETT.